United States Patent [19]

Okamoto et al.

[11] Patent Number: 4,564,897
[45] Date of Patent: Jan. 14, 1986

[54] POWER SOURCE

[75] Inventors: Futoshi Okamoto, Hirakata; Masataka Mitani, Tsuzuki, both of Japan

[73] Assignee: Matsushita Electric Works, Ltd., Osaka, Japan

[21] Appl. No.: 566,986

[22] Filed: Dec. 30, 1983

[30] Foreign Application Priority Data

Jan. 14, 1983 [JP] Japan ................... 58-4983

[51] Int. Cl.$^4$ .......................... H02M 7/537
[52] U.S. Cl. .................... 363/132; 363/37; 363/98; 363/47
[58] Field of Search .............. 363/37, 44, 45, 46, 363/47, 48, 89, 98, 126, 132

[56] References Cited

U.S. PATENT DOCUMENTS 4,277,728  4/1981  Stevens .................. 315/307

FOREIGN PATENT DOCUMENTS 2022943 12/1979 United Kingdom .

Primary Examiner—Peter S. Wong
Assistant Examiner—Judson H. Jones
Attorney, Agent, or Firm—Stevens, Davis, Miller & Mosher

[57] ABSTRACT

A power source for providing a high frequency ac output voltage is provided with a rectifier, a smoothing circuit with an inductor and a smoothing capacitor, and an inverter having a switching device for switching the input dc voltage from the rectifier to provide a high frequency ac voltage output with reduced ripple. Also included in the smoothing circuit is a charge storage device by the operation of which the inductor receives electromagnetic energy from the current therein when the switching device is switched on and electromagnetic energy is fed to the smoothing capacitor to charge the same when the switching device is switched off, with the resulting voltage developed across the capacitor being applied to the inverter input. The charge storage device includes the inductor of the smoothing circuit and the switching device common to the inverter, such that the charge storage device is of the chopper-type which enables the inductor to be reduced to a smaller value while allowing it to retain a high power factor, and such that it can be readily incorporated in the power supply without requiring any additional switching devices and without undue increase in the component costs.

4 Claims, 47 Drawing Figures

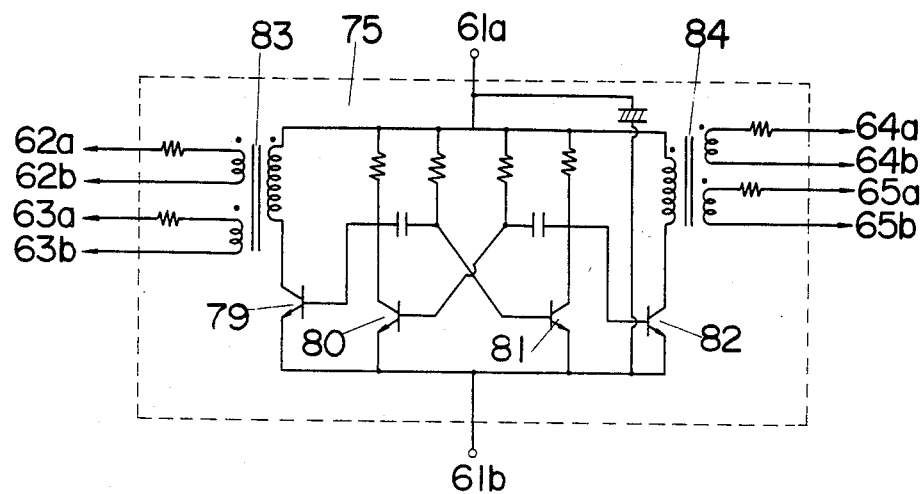
Fig. 8
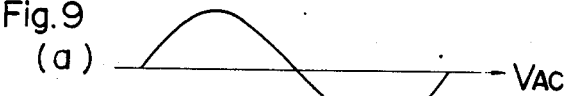
Fig. 9 (a) — $V_{AC}$
Fig. 9 (b) — $I_{DC}$
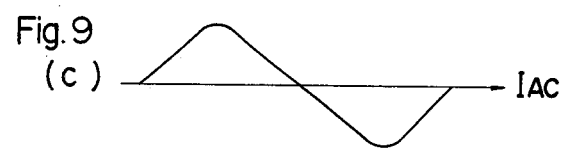
Fig. 9 (c) — $I_{AC}$

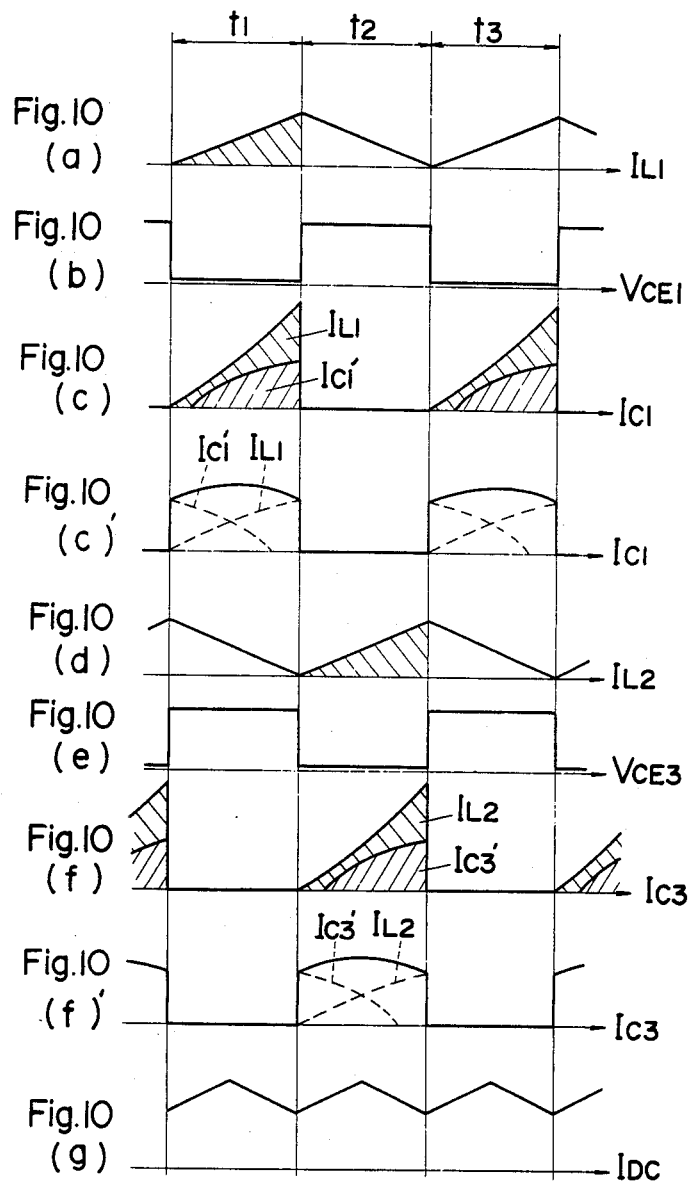

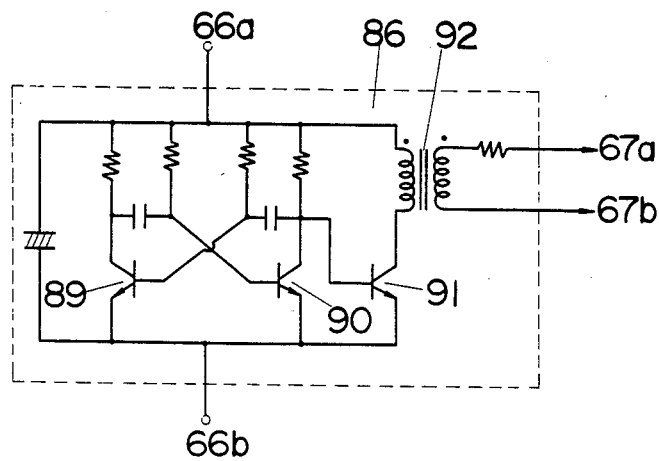
Fig. 12
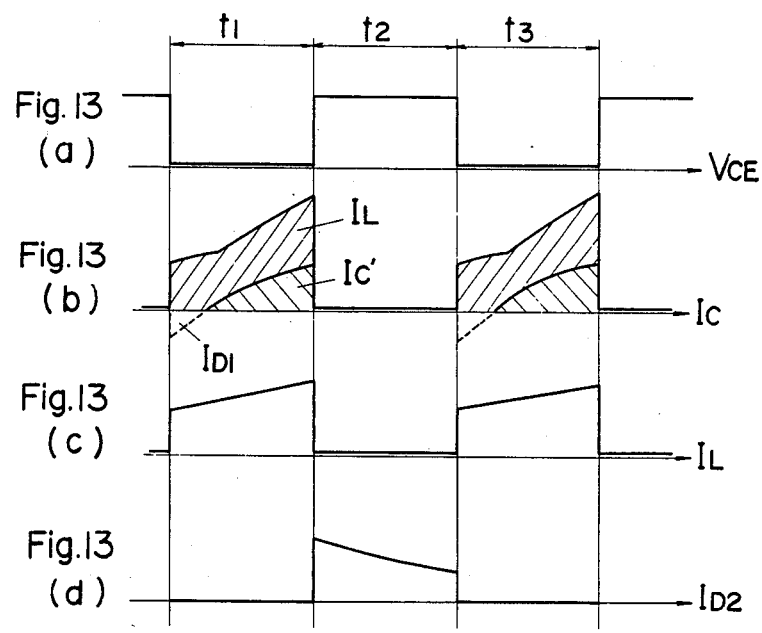
Fig. 13 (a)
Fig. 13 (b)
Fig. 13 (c)
Fig. 13 (d)

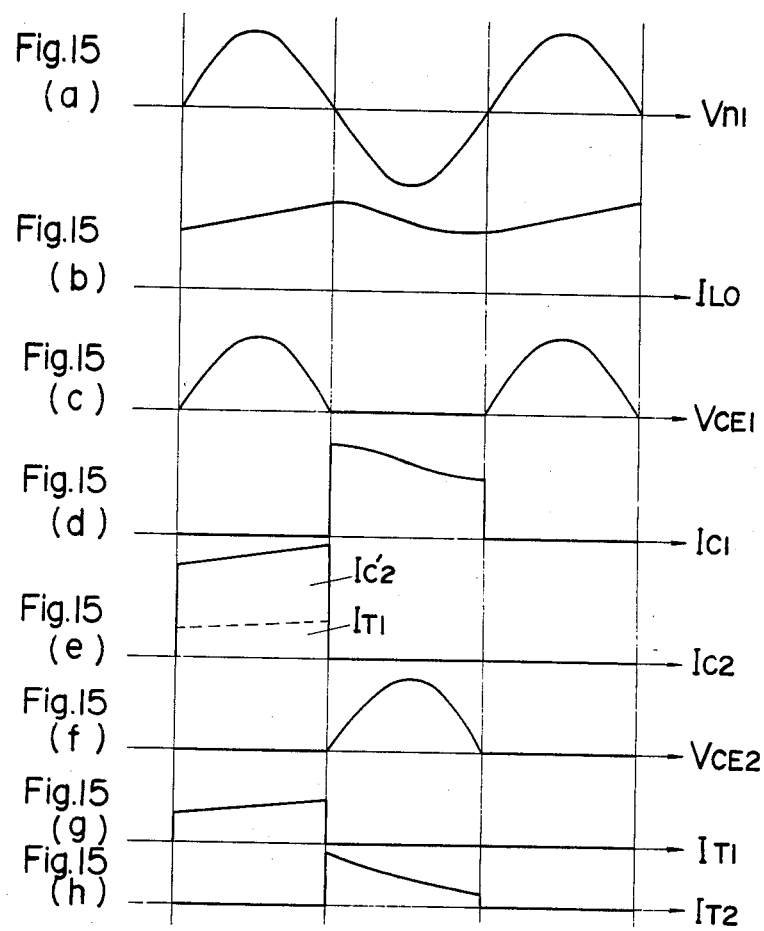
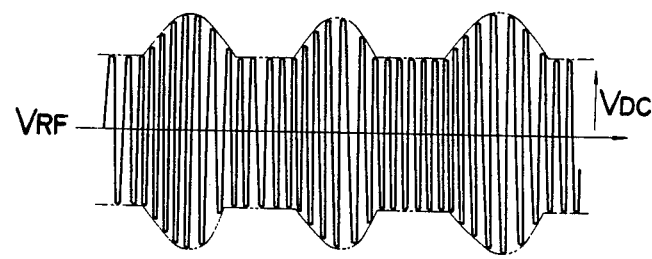
Fig. 16

POWER SOURCE

BACKGROUND OF THE DISCLOSURE

1. Field of the Invention

This invention is directed to a power source for converting an ac line voltage into a high frequency output ac voltage, and more particularly, to a power source which provides a high frequency output ac voltage with a reduced ripple suitable for operating discharge lamps such as fluorescent lamps.

2. Description of the Prior Art

One known type of such power source for the discharge lamps comprises an inverter, a full-wave diode bridge rectifier and a smoothing capacitor interposed therebetween, the smoothing capacitor being responsible for smoothing the pulsating dc voltage from the rectifier output so as to apply a resulting dc voltage with a reduced ripple to the input terminals of the inverter which in turn provides a high frequency ac voltage output for operating a discharge lamp load. However, this necessitates a smoothing capacitor which has a higher capacitance which should be connected across the output ends of the rectifier to therefore act as a reactive load with a corresponding higher capacitive reactance, thus reducing the power factor which is a serious problem and drawback to a power source of the above kind. For improving the power factor, there has been provided another prior art power source which includes a choking coil connected between the like smoothing capacitor and the like rectifier so as to counteract or reduce the higher capacitive reactance of the smoothing capacitor. Such choking coil, however, should be limited to have a high impedance against a low frequency range and is exceptionally bulky and expensive, which disadvantageously increases the size and the component cost of the power source. In view of the above, there has been proposed another prior power source for improving the power factor, such as is shown in FIG. 1, which comprises a rectifier 3 to provide full-wave rectification of an input ac line voltage fed through a filter 2 composed of a filter capacitor 20 and a filter choke 21, an inverter 5 for receiving the dc voltage from the rectifier 3 and providing a high frequency output ac voltage to a discharge lamp load 6, and a smoothing circuit 4' provided therebetween and consisting of a chopper 40 and a smoothing capacitor 41. The chopper 40 is formed by a choking coil or inductor 42, a switching transistor 43, a control circuit 44 for the switching transistor 43, and an isolation diode 45, and is so arranged that when the voltage developed across the smoothing capacitor 41 exceeds the input line voltage the switching transistor 43 is driven to perform on-off operation for improving the power factor. This prior device permits the employment of an inductor with a much reduced inductance and therefore is of smaller size and is less expensive, one disadvantage exists in that chopper 40 additional to the inverter 5 must require the switching transistor 43 as well as the control circuit 44 thereof, and therefore adds the complexity to circuit and results in a corresponding increase in cost.

SUMMARY OF THE INVENTION

The above disadvantages or drawbacks have been eliminated by the present invention which adopts a unique arrangement of a smoothing circuit. A power source in accordance with the present invention comprises, in addition to the smoothing circuit, a rectifier to provide full-wave rectification of an ordinary ac input line voltage and an inverter which receives the rectifier output to provide a high frequency output at its output terminals, to which a load such as a discharge lamp is connected in order to be driven by that output voltage. The smoothing circuit is composed of inductor means, a smoothing capacitor, and charge storage means of chopper-type which operates to store in the smoothing capacitor electromagnetic energy from the current flowing through the inductor. The charge storage means and the inverter share the switching means and the control circuit thereof, both of which are constituents of the inverter and act on the side of the smoothing circuit to charge the smoothing capacitor. The resulting voltage developed across the capacitor is then applied to the input terminals of the inverter. That is, the rectifier output is applied through the inductor of the smoothing circuit to the switching means which is common to the inverter and to the smoothing circuit, such that when the switching means is on the inductor is supplied with electromagnetic energy which is in turn to be stored in the capacitor when said switching means is off. With this arrangement of the charge storage means having the switching means common to the inverter, it is possible to add the chopper to the inverter without requiring any additional switching means and the control circuit therefor, which keeps the component costs to a minimum while retaining the advantages arising from the employment of the chopper, the advantages being that an inductor with a smaller inductance and therefore a smaller size, can be sufficient to ensure a high power factor and that the inverter can produce a high frequency ac voltage output with less variation in amplitude since the input dc voltage is fed through the smoothing capacitor resulting in a reduced ripple. Such high frequency ac voltage output is especially suitable for operating the discharge lamp and assures a stabilized discharge performance, an increased lighting efficiency and a reduced flickering.

Accordingly, it is a primary object of the present invention to provide a power source which is simple in construction and inexpensive yet assures a high power factor and a high frequency output voltage with less variation in amplitude.

In a preferred embodiment of the present invention, there is disclosed an advantageous combination of the smoothing circuit and the inverter. The inverter comprises a pair of switching transistors in series which serve as said switching means to alternately switch the dc voltage from the smoothing circuit for providing a high frequency ac voltage, each switching transistor being connected antiparallel with a diode in the circuitry of the inverter for achieving the above-described switching operation. The charge storage means for chopper-type provided in the smoothing circuit shares one of the above switching transistors with the inverter so that it can be incorporated in the power source without providing additional switching transistor just as described in the above. Additionally, it is most desirable in the smoothing circuit with such charge storage means to provide an isolation diode for preventing reverse current flow back from the smoothing capacitor into the inductor. In this instance, the diode coupled to the switching transistor which is not common to the smoothing circuit is utilized as the isolation diode for preventing such reverse current flow, thus no additional diode is required for the charge storage means or for the smoothing circuit, thus attaining a more simple circuit arrangement of the power source.

It is therefore another object of the present invention to provide a power source which reduces the complexity of the circuitry.

A further preferred embodiment is disclosed in the present invention which employs an inverter of different configuration. The inverter comprises two pairs of switching transistors each pair being composed of two switching transistors connected in series so as to perform an alternate switching operation and each switching transistor being connected antiparallel with a polarized diode for that switching operation. These four switching transistors are connected in series-parallel combinations to form a full-bridge arrangement. Cooperating with the inverter is a smoothing circuit of unique configuration which has a single smoothing capacitor, a pair of inductors, and a pair of the switching transistors common to the inverter and being respectively those which are arranged in a substantially 180 degrees out of phase relationship with respect to the current flowing therein. Thus, the smoothing circuit can have a pair of the charge storage means of chopper-type each composed of one inductor and one switching transistor common to the inverter whereby each switching transistor is allowed to bear a reduced amount of current flowing therein at the time of charging the capacitor. Consequently, the switching transistor can be selected to have a lower permissible current and thus to be less expensive. In addition to the above, since the switching transistors constituting the corresponding charge storage means are arranged in such a relationship that the currents in the respective transistors are substantially 180 degrees out of phase, there appears a reduced ripple in the current flowing in the smoothing circuit, which in turn reduces a noise flowing back to the line voltage. This enables the employment of a noise filter with a smaller capacitor and inductor. Also with this arrangement, each of the diodes coupled respectively to the switching transistors which are also common to the inverter and the smoothing circuit is connected between the smoothing capacitor and one of the inductors such that said electromagnetic energy stored in the respective inductors is allowed to be successfully fed into the capacitor.

Therefore, it is a further object of the present invention to provide a power source which does not require a large capacitor and inductor for the noise filter which is usually incorporated in a power source of this kind.

In the present invention, there is disclosed a still further advantageous feature in which both outputs of a rectifier and a smoothing circuit are connected to an inverter input to drive the same in such a way that the inverter normally receives the input voltage from the rectifier and receives the input voltage from the smoothing capacitor only when the voltage from the rectifier falls below the voltage developed across the capacitor. That is, the smoothing circuit acts as an auxiliary power supply along with its primary function. An isolation diode is connected in series with the capacitor to prevent the reverse current flow from the rectifier directly into the capacitor. As a result, the smoothing capacitor constituting the smoothing circuit is permitted to be reduced to a small value or a small size, which also enables reduction in the requirement for the switching transistor responsible for the above charge storage means as well as the inverter.

It is therefore a still further object of the present invention to provide a power source which is capable of reducing the value or capacity requirements, as well as dimensional requirements, of the components employed.

These and above advantageous features will be more apparent from the following detailed description of the present invention taken in conjunction with the accompanying drawings.

BRIEF DESCRIPTION OF THE DRAWINGS

In the drawings,

FIG. 8 is a schematic circuit diagram of a control circuit employed in the circuit of FIG. 7;

FIGS. 9(a) to 9(c) and FIGS. 10(a) to 10(g) are respectively wave form diagrams helpful in understanding the operation of the circuit of FIG. 7;

FIG. 12 is a schematic circuit diagram of a control circuit employed in the circuit of FIG. 11;

FIGS. 13(a) to 13(d) are respectively wave form diagrams helpful in understanding the operation of the circuit of FIG. 11;

FIGS. 15(a) to 15(h) and FIG. 16 are respectively wave form diagrams helpful in understanding the operation of the circuit of FIG. 14.

DETAILED DESCRIPTION OF THE PREFERRED EMBODIMENTS

Figure 1:
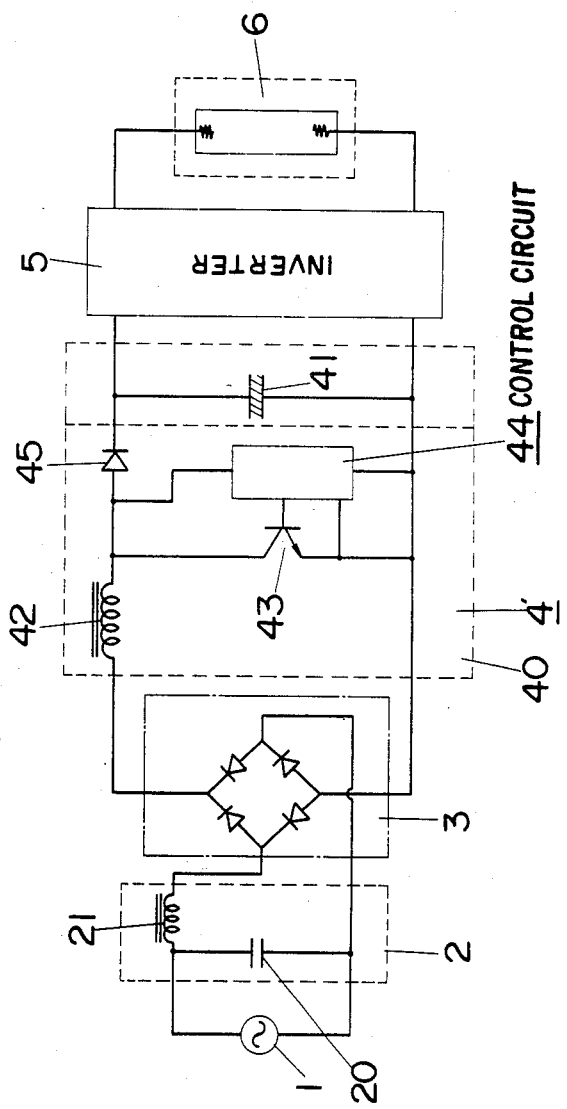
FIG. 1 is a schematic diagram illustrating a prior art power source.
Figure 2:
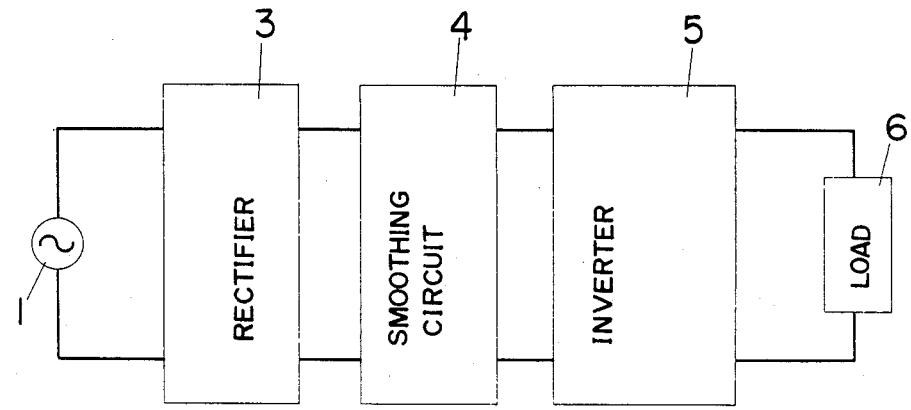
FIGS. 2 and 3 are respectively function block diagrams of a power source embodying the present invention.
Figure 3:
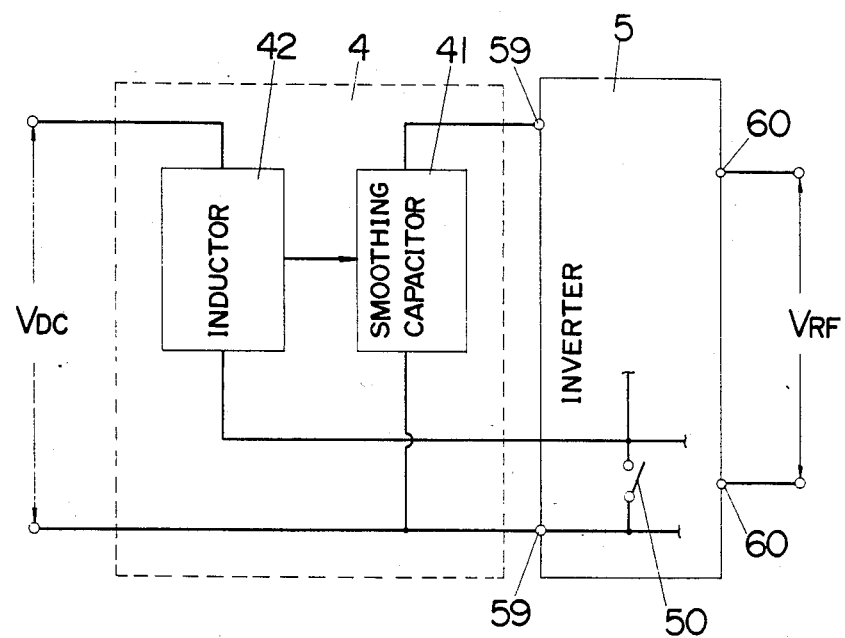

Referring now to the drawings and particularly to FIGS. 2 and 3, there is illustrated in greatly schematic representations a basic arrangement of the present invention which comprises a rectifier 3, a smoothing circuit 4 and an inverter 5. The rectifier 3 is a full-wave rectifier for receiving an input ac line voltage and providing a pulsating dc voltage which is applied to the smoothing circuit 4 which includes a smoothing capacitor 41 and inductor means 42. The output voltage with a reduced ripple from the smoothing circuit 4 is applied to the input terminals 59 of the inverter 5 in which switching means 50 alternately switches the input voltage so as to provide a high frequency ac voltage at the output terminals 60 which are connected to a load 6 to be driven by the high frequency ac output voltage. Said switching means 50 of the inverter is cooperative with the inductor means 42 of said smoothing circuit 4 to form charge storage means of which arrangement is an important feature of the present invention. The charge storage means is of the chopper-type which performs an operation such that when the switching means 50 is switched on the inductor means 42 is supplied from the current flowing therein with electromagnetic energy which is in turn stored in the smoothing capacitor 41 when switching means 50 is switched off. The resulting voltage developed across the capacitor 41 is applied to the input terminals 59 of the inverter 5. A more detailed description of the present invention will be now made with reference to the respective preferred embodiments.

Figure 4:
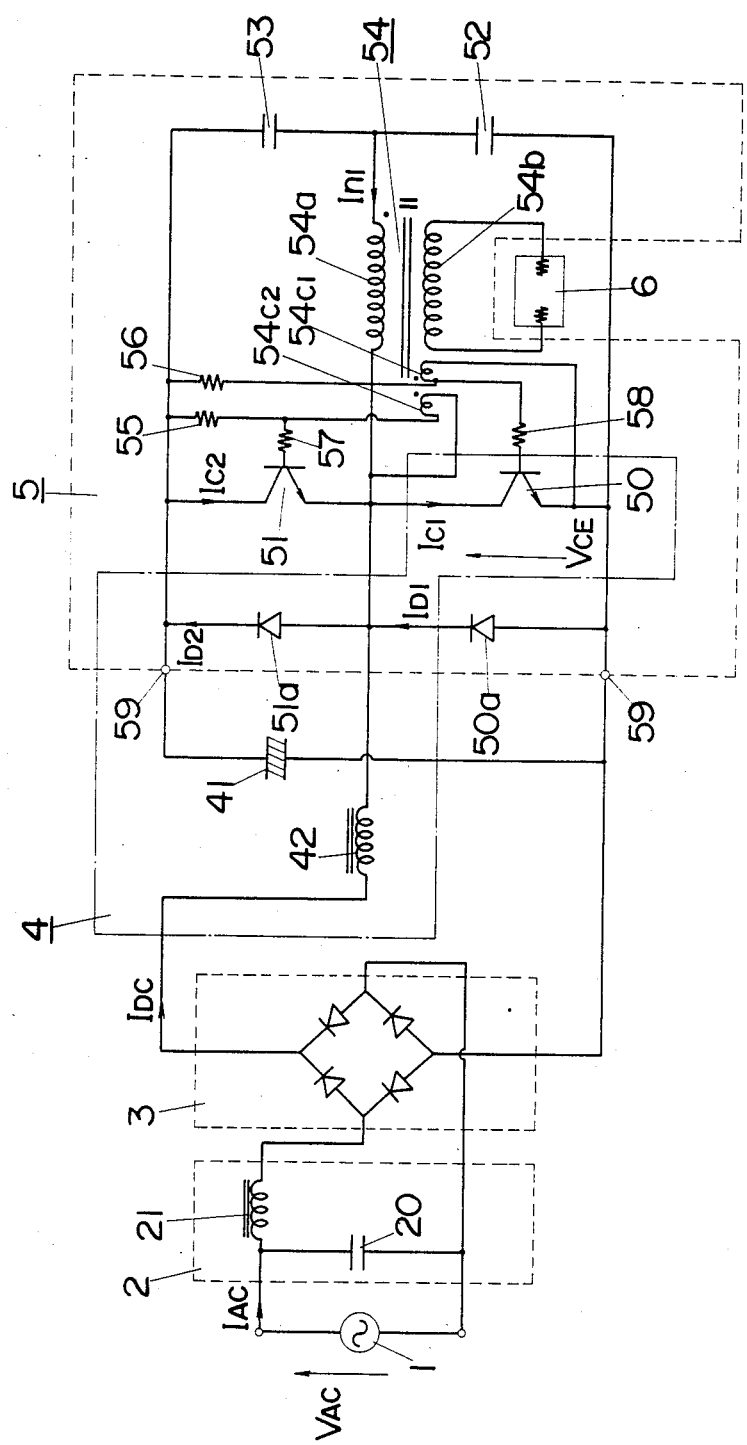
FIG. 4 is a schematic circuit diagram of the power source in accordance with a first embodiment of the present invention.
Figure 5:
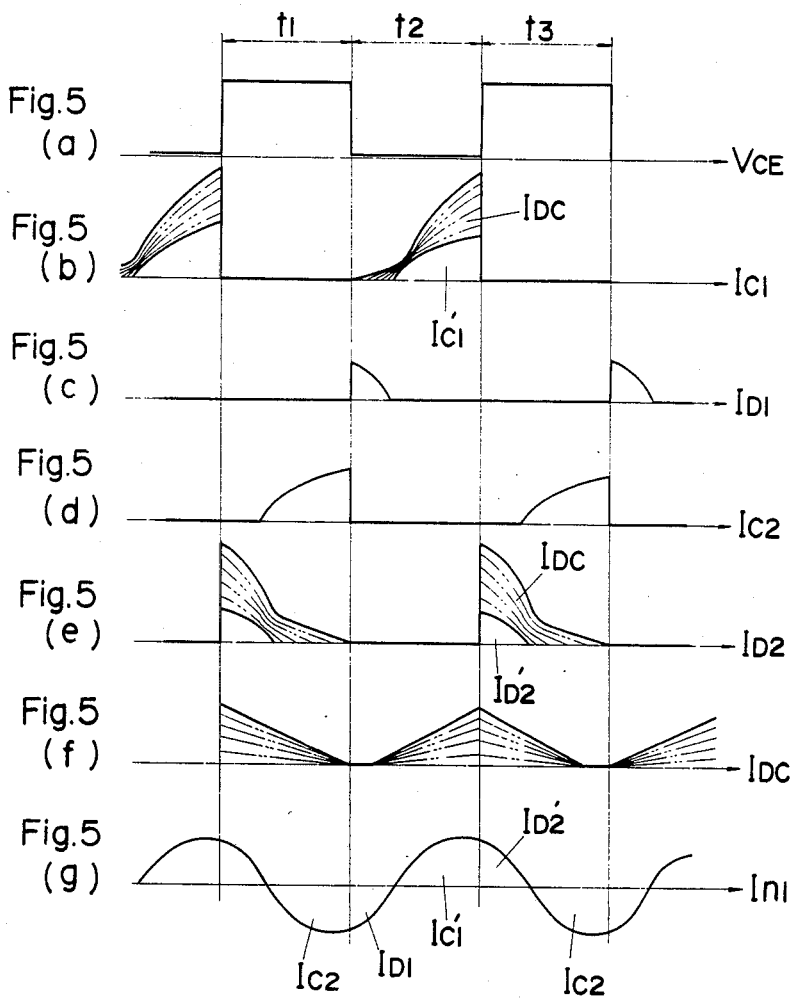
FIGS. 5(a) to 5(g) and FIGS. 6(a) to 6(e) are respectively wave form diagrams helpful in understanding the operation of the circuit of FIG. 4.
Figure 6:
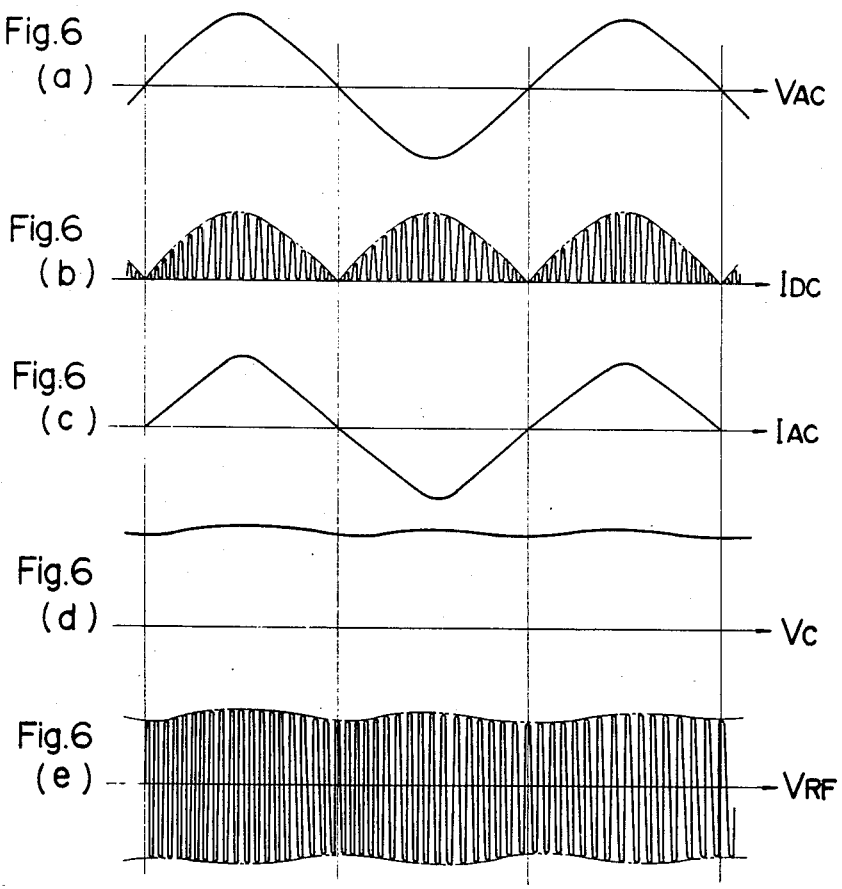

The first embodiment is shown in FIGS. 4 through 6.

Referring first to FIG. 4, an inverter 5 includes as the switching means a pair of switching transistors 50 and 51 to alternately switch the input dc voltage for providing a high frequency ac output voltage to a discharge lamp load 6 such as a fluorescent lamp to be driven thereby. Each of the switching transistors 50 and 51 is shunted by an oppositely polarized diode 50a, 50b and these transistors are connected in series across the input terminals of the inverter 5. Also included in the inverter 5 are a pair of capacitors 52 and 53 in series combination, an output transformer 54, and resistors 55 to 58. The output transformer 54 has, in addition to a primary winding 54a and a secondary winding 54b, first and second feedback windings $54c_1$ and $54c_2$ for applying drive voltages respectively to the bases of the transistors 50 and 51, with the output end of the secondary winding 54b defining the output terminals of the inverter 5 to be connected to the load 6. The series combination of the switching transistors 50 and 51 is connected in parallel with the series combination of the capacitors 52 and 53 so as to form a half-bridge arrangement. The primary winding 54a of said output transformer 54 is in circuit with its one end being connected to the junction between the transistors 50 and 51 and with the opposite end connected to the junction between the capacitors 52 and 53. A smoothing circuit 4 comprises a smoothing capacitor 41 an inductor 42, and further includes the one switching transistor 50 and the one diode 51a both of which are common to said inverter 5. These components are arranged such that the smoothing capacitor 41 is connected across the input terminals 59 of the inverter 5, while the output $V_{DC}$ of the rectifier 3 is applied through the inductor 42 to that transistor 50. This means that the smoothing circuit 4 includes charge storage means of chopper-type which is formed chiefly by said switching transistor 50 and the inductor 42 for charging the smoothing capacitor 41 by the help of that transistor 50. That is, when the switching transistor 50 is switched on, the inductor 42 is supplied from the current flowing therein with electromagnetic energy which is then stored in the smoothing capacitor 41 when the transistor 50 is switched off, and the resulting voltage developed across the smoothing capacitor 41 is applied to the input terminals 59 of the inverter 5. This charge storage means further includes said first and second feedback wirings $54c_1$ and $54c_2$ of the output transformer 54 which are common to the inverter 5 and cooperative with the components in the inverter 5 to constitute a control circuit for said switching transistor 50. Said diode 51a coupled antiparallel with the other switching transistor 51 of the inverter 5 is connected between the smoothing capacitor 41 and the inductor 42 so as to form a unidirectional path for allowing the current or said electromagnetic energy only from the inductor 42 to the capacitor 41, thus serving as an isolation diode in the smoothing circuit 4. In this instance, inverter 5 is illustrated as a self-excited type which includes the output transformer 54 with the feedback windings $54c_1$ and $54c_2$ for controlling the switching transistors 50 and 51, however, an inverter of the type in which an astable multivibrator is utilized for alternately switching the above transistors can be used for the purpose of the present invention. It should be also noted in the present instance that the capacitor 52 can be eliminated.

The operation of the above first embodiment will be explained with reference to FIGS. 5(a) to 5(g) in which the voltages and currents at the principal portions are plotted against a relatively short time period, as well as with reference to FIGS. 6(a) to 6(e) in which those at other principal portions are plotted against a greatly extended time period. Prior to following the operation, references are now made to the designation of the particular portions of which voltages and currents are illustrated in wave forms. FIG. 5(a) illustrates the wave form of the voltage $V_{CE}$ across transistors 50; FIG. 5(b) for the collector current $I_{C1}$ of transistor 50; FIG. 5(c) for the forward current $I_{D1}$ of diode 50a; FIG. 5(d) for the collector current $I_{C2}$ of transistor 51; FIG. 5(e) for the forward current $I_{D2}$ of diode 51a; FIG. 5(f) for the output current $I_{DC}$ from rectifier 3, or the current in the inductor 42; FIG. 5(g) for the current $I_{n1}$ flowing through the primary winding 54a of output transformer 54; and FIG. 6(a) for input line voltage $V_{AC}$; FIG. 6(b) for the output current $I_{DC}$ from rectifier 3; FIG. 6(c) for the input current $I_{AC}$ to rectifier 3; FIG. 6(d) for the voltage Vc across smoothing capacitor 41; FIG. 6(e) for the high frequency voltage $V_{RF}$ output from inverter 5.

In operation, when the rectifier 3, which is a full-wave diode bridge rectifier, receives the input voltage through a noise filter 2 from the ac line voltage, it outputs a pulsating dc voltage which produces a current through the inductor 42 and diode 51a so that the smoothing capacitor 41 charges up to a predetermined level, as in the manner described hereinafter. Upon this occurrence, a base current is fed from the smoothing capacitor 41 to the transistor 50 through the start-up resistors 55 and 56 so as to turn on the one of the transistors 50 and 51 and turn off the other. At this time, there exist induced voltages across the feedback wirings $54c_1$ and $54c_2$ of the output transformer 54 for reversing the transistors so that the transistors 50 and 51 will cycle on and off continuously, such voltages being induced by an oscillatory circuit composed of the capacitors 52 and 53, the primary and secondary windings 54a and 54b of the output transformer 54, and the load 6.

In FIGS. 5(a) to 5(g), $t_1$ and $t_3$ represent respectively the time periods during which the transistor 50 is on and the other transistor 51 is off, as t2 represents the time period during which the transistor 50 is off and the transistor 51 is off. In said oscillatory circuit, an oscillating current will flow to provide a current $I_{n1}$ through the primary winding 54a of the output transformer 54. Current $I_{n1}$ is divided to flow in the transistors 50 and 51 and the diodes 50a and 51a, while there flows in the load 6 a current $I_{n1} \times n1/n2 <$ where $n_1/n_2$ is the turn ratio of the primary winding 54a to the secondary winding 54b>. In the above figures, there are illustrated the operational wave forms which are produced when the switching frequency for the transistors 50 and 51 is set to be above the natural frequency of the oscillatory circuit, and thus the current $I_{n1}$ appears as a lagging current. During the time period $t_1$ of turning on the transistor 50, the transistor 50 sees a combined or added current $I_{C1}$ of the current $I'_{C1}$ divided from the $I_{n1}$ plus the current $I_{DC}$ through the inductor 42 from the rectifier 3. It is at this time that the inductor 42 receives from the current $I_{DC}$ electromagnetic energy to be stored therein. During the time period $t_2$ of turning off the transistor 50, the electromagnetic energy stored in the inductor 42 is released into the smoothing capacitor 41 through the diode 51a and the diode bridge of the rectifier 3 so as to charge that smoothing capacitor 41. In this occurrence, the diode 51a sees a combined current $I_{D2}$ of the current $I'_{D2}$ divided from the current $I_{n1}$ plus the output current $I_{DC}$ from the rectifier 3. It is to be noted that the portions indicated by dashed lines in FIGS. 5(b), 5(e) and 5(f) are introduced to show the variations in the respective currents in each half cycle, such variations resulting from the ripples involved therein. As is apparent from the above, said charge storage means of chopper-type is formed by the inductor 42 of the smoothing circuit 4 itself, the switching transistor 50, and the diode 51a, the last two of which are common to the inverter 5. Accordingly, it can also share with inverter 5 the control circuit associated with the switching transistor 50, whereby it can be readily incorporated in the power source without requiring separate or additional components for the charge storage means, thus reducing the complexity and the component costs.

The second embodiment is illustrated in FIGS. 7 through 10.

Figure 7:
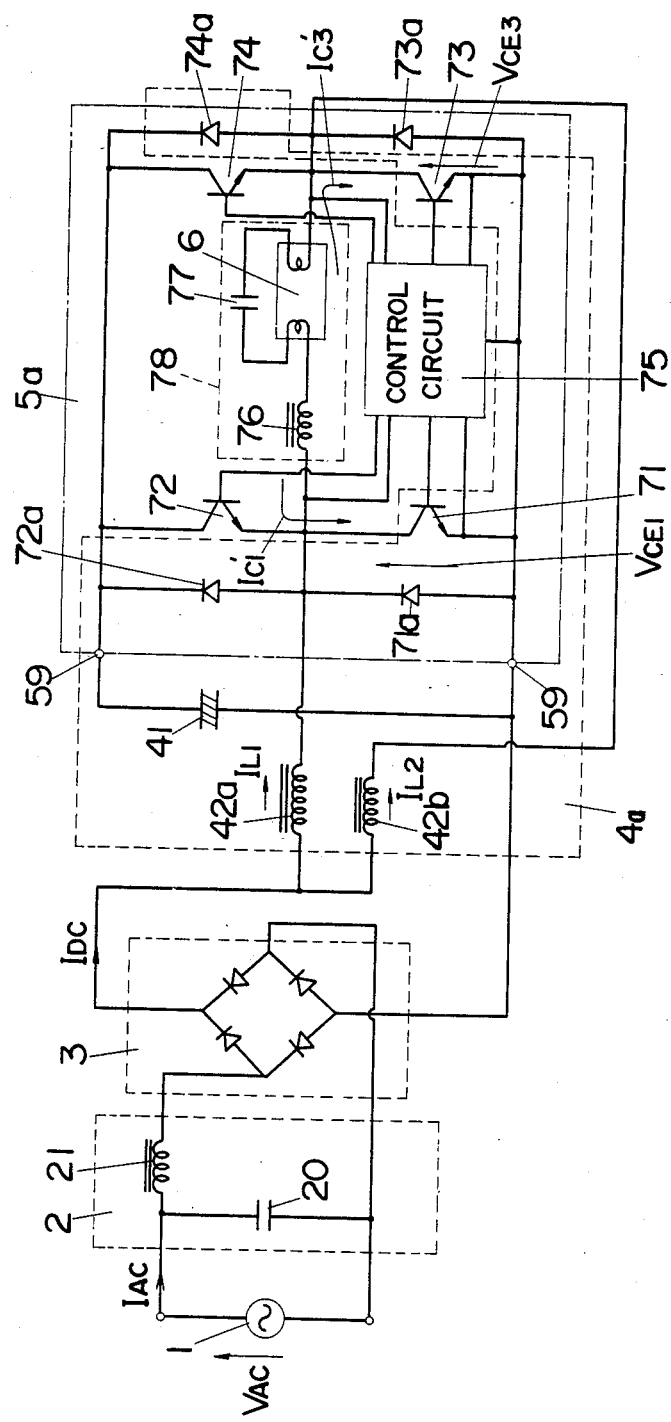
FIG. 7 is a schematic circuit diagram of the power source in accordance with a second embodiment of the present invention.

A converter 5a in this embodiment, as shown in FIG. 7, comprises two pairs of switching transistors 71 to 74 each pair having two transistors connected in series, diodes 71a to 74a each connected antiparallel to each one of the above transistors, and a control circuit 75 which is a multivibrator for controlling the switching operation of the transistors 71 to 74. The series combination of said transistor pair 71 and 72 is connected in parallel with the other series combination of transistor pair 73 and 74 so as to form a full-bridge arrangement to which is coupled a load circuit 78 which has one end connected to the junction between the transistors 71 and 72 and its opposite end connected to the junction between the transistors 73 and 74. Load circuit 78 is an L-C network composed of a choke 76 and capacitor 77 and including a discharge lamp load 6. Said control circuit 75, as shown in FIG. 8, comprises transistors 79 to 82, pulse transformers 83 and 84, and has input terminals 61a and 61b, and output terminals 62a, 62b to 66a, 66b for providing control output signals to turn on and off continuously said switching transistors in each pair, while establishing a 180 degrees out of phase relationship between the transistors 71 and 73 with respect to the switching currents flowing in the respective transistors 71 and 73. Turning back to FIG. 7, a smoothing circuit 4a comprises a smoothing capacitor 41, a pair of inductors 42a and 42b, the switching transistors 71 and 73 which are common to the inverter 5a, and the diodes 72a and 74a which are also common to the inverter 5a, so as to have therein charge storage means composed of switching transistors 71 and 73, inductors 42a and 42b, and of diodes 72a and 74a. These components are arranged in the same way as in the first embodiment such that the output from the rectifier 3 is applied to the respective transistors 71 and 73 through the cooperative inductors 42a and 42b, whereby electromagnetic energy once stored in the respective inductors 42a and 42b at the time of the corresponding transistors being turned on will be released through the diodes 72a and 74a into the single smoothing capacitor 41 to charge the same at the time of the corresponding transistors being turned off, with the resulting voltage developed across the capacitor 41 being applied to the input terminals 59 of the inverter 5a. This means that said charge storage means serves to be of the chopper-type for charging the smoothing capacitor 41 by the on-off operations of the switching transistors 71 and 73, the details of which will be described in the following paragraph.

The operation of the second embodiment will be explained hereinafter with reference to FIGS. 9(a) to 9(c) in which the voltage and currents at principal portions are plotted against a relatively short time period and with reference to FIGS. 10(a) to 10(g) in which voltages and currents at other principal portions are plotted against a greatly extended time period. First, more detailed references to the above figures are made for easy understanding of the following description with regard to the operation of the second embodiment. FIG. 9(a) illustrates the wave form of the input line voltage $V_{AC}$; FIG. 9(b) for output current $I_{DC}$ from rectifier 3; FIG. 9(c) for the input current $I_{AC}$ to rectifier; FIG. 10(a) for the current $I_{L1}$ in inductor 42a; FIG. 10(b) for the voltage $V_{CE1}$ across transistor 71; FIGS. 10(c) and 10(c') for the collector current $I_{C1}$ of transistor 71; FIG. 10(d) for the current $I_{L2}$ in inductor 42b; FIG. 10(e) for the voltage $V_{CE3}$ across transistor 73; FIGS. 10(f) and 10(f') for the collector currents $I_{C3}$ of transistor 73; and FIG. 10(g) for the output current $I_{DC}$ from rectifier 3, the output current $I_{DC}$ being a combined one of the currents $I_{L1}$ plus $I_{L2}$ respectively flowing through inductors 42a and 42b. In operation, when the inverter 5a receives at the input terminals 59 a voltage with a reduced ripple from the smoothing circuit 4a, the transistors 71,72 and 73,74 in each pair are driven to cycle on and off continuously so as to provide at the output end of the inverter 5a a high frequency output voltage with a reduced ripple, which is utilized to light the discharge lamp 6 in a stabilized manner and without flickering. In FIGS. 10(a) to 10(g), $t_1$ and $t_3$ represent respectively the time periods during which the transistors 71 and 74 are on, while $t_2$ represents the time period during which the transistors 72 and 73 are off. Also in the same figures illustrate for easy understanding of the operation, currents $I'_{C1}$ and $I'_{C3}$ resulting from the operation of the inverter 5a; these currents $I'_{C1}$ and $I'_{C3}$ are combined respectively with the currents $I_{L1}$ and $I_{L2}$ flowing through the corresponding inductors 42a and 42b to provide the collector currents $I_{C1}$ and $I_{C3}$ of the transistors 71 and 73, respectively. During the time period $t_2$ of turning on the transistor 71, the currnt $I_{L1}$ will flow from the rectifier 3 through the inductor 42a and the transistor 71 to supply that inductor 42a with electromagnetic energy. During the subsequent time period $t_2$ of turning off the transistor 71, the above electromagnetic energy stored in the inductor 42a will be released through the diode 72a and the diode bridge of the rectifier 3 into the capacitor 41 to charge the same. Thus, there is formed in the smoothing circuit 4a one charge storage means of chopper-type for charging the capacitor in response to the switching operation of the transistor 71 in the inverter 5a in the same way in the above first embodiment. That is, the charge storage means in this instance is composed of the inductor 42a, the switching transistor 71 and the diode 72a, the last two of which are common to the inverter 5a. In addition to the above, there is also formed in the same smoothing circuit 4a another charge storage means likewise operated in response to the switching operation of the transistor 73 in the inverter 5a and therefore composed of the inductor 42b, the switching transistor 73 and the diode 74a, the last two of which are also common to the inverter 5a. Accordingly, the smoothing circuit 4a in this embodiment can have a pair of the charge storage means sharing the switch means and the control circuit therefor with the inverter 5a, which can reduce the requirement for each of the transistors 71 and 73. As a result of this, these transistors are permitted to be reduced to a small value with respect to its allowable current, and therefore to be reduced to a low component cost. Further, in the present embodiment, since the output current $I_{DC}$ from the rectifier 3 is to be a combination of the currents $I_{L1}$ and $I_{L2}$ which flow through the respective inductors 42a and 42b and which are 180 degrees out of phase, the output current $I_{DC}$ can have a lesser amount of ripple whereby a noise filter 2 to be incorporated in the circuit can be reduced to a much smaller value and size than that to be employed in the first embodiment. FIGS. 10(c), 10(c'), 10(f) and 10(f') illustrate the difference in the wave forms between those of the collector currents $I_{C1}$ and $I_{C3}$ depending upon the relationship between the natural frequency of the load circuit 78 and the switching frequency of the transistors 71 to 74. FIGS. 10(c) and 10(f) explain the case in which the natural frequency of the load circuit 78 is set to be lower than the switching frequency of said transistors to have lagging currents $I_{C1}$ and $I_{C3}$ in the circuit, while on the other hand, FIGS. 10(c') and 10(f') explain the case in which the natural frequency is set to be higher than the switching frequency in order to have leading currents $I_{C1}$ and $I_{C3}$ in the circuit. It is found from the above figures that the latter case is more advantageous for improving the efficiency of the device because of the fact that there appear the currents with a less peak value in the respective transistors 71 to 74 to reduce the power loss at the time of switching the transistors. In the present embodiment, the inverter 5a with two pairs of switching transistors 71 to 74 is employed, but the inverter 5a of such configuration may be replaced by an inverter which comprises a pair of switching transistors connected in push-pull relationship to cycle on and off continuously, such as is shown in a fourth embodiment described below, and in which a pair of the charge storage means are formed in the smoothing circuit by utilizing both the switching transistors common to such inverter.

Figure 11:
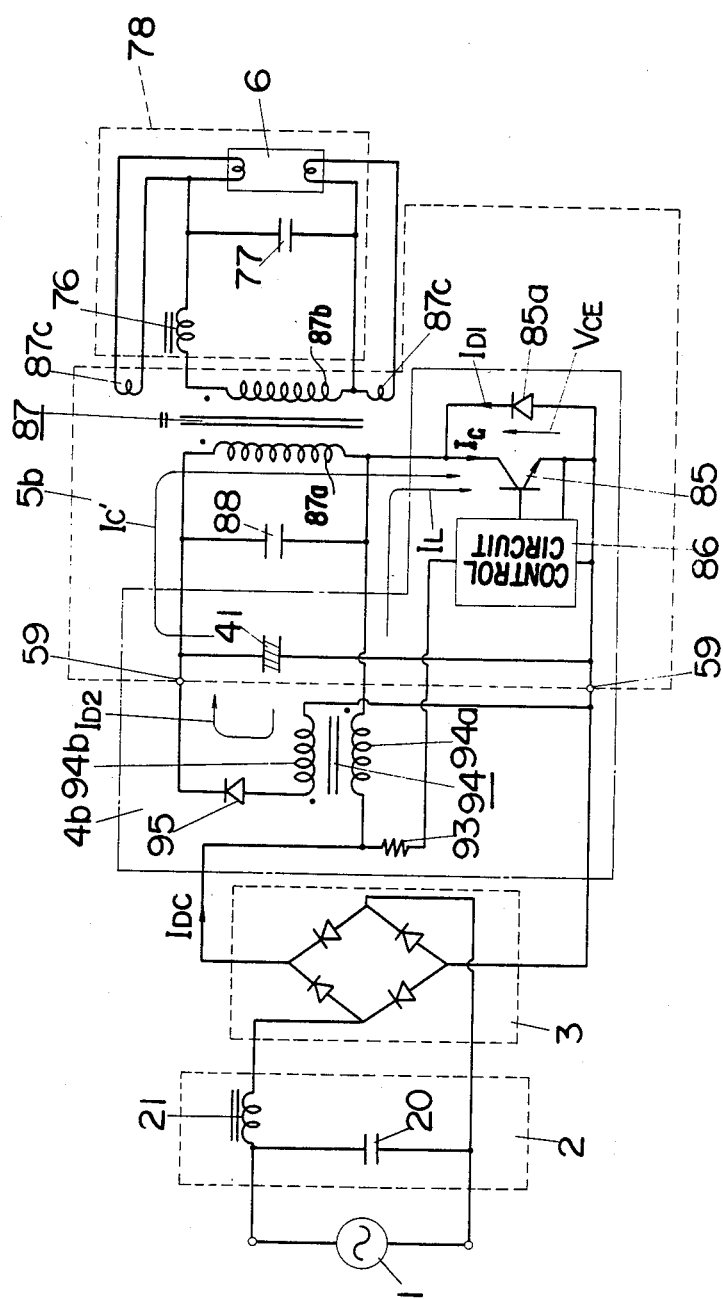
FIG. 11 is a schematic circuit diagram of the power source in accordance with a third embodiment of the present invention.

The third embodiment is illustrated in FIGS. 11 through 13.

Referring first to FIG. 11, an inverter 5b comprises a single switching transistor 85 to which a diode 85a is connected in antiparallel, a control circuit 86 for the transistor 85, a capacitor 88, and an output transformer 87 with a pair of filament windings 87c for heating the filaments in the discharge lamp load 78. Said control circuit 86, as shown in FIG. 12, comprises transistors 89 to 91 and a pulse transformer 92, and serves as a multivibrator which receives at its input terminals 66a and 66b the output from the rectifier 3 through a resistor 93 to provide at its output terminals 67a and 67b a control signal for controlling the transistor 85 to turn it on and off at a predetermined frequency. Cooperating with the inverter 5b is a smoothing circuit 4b which define therein charge storage means for charging smoothing capacitor 41 in response to the switching operation of the transistor 85. Said smoothing circuit 4b is composed of, in addition to the smoothing capacitor 41, a transformer 94, a diode 95, the switching transistor 85 and the control circuit 86, the last two of which are common to the inverter 5b, thus forming said charge storage means with transformer 94, diode 95 and switching transistor 85. That is, these components are arranged in circuit such that the output from the rectifier 3 is applied via a primary winding 94a of the transformer 94 serving as an inductor across the transistor 85 to charge the smoothing capacitor 41 with the resulting output from a secondary winding 94b of the transformer 94 and rectified by the diode 95.

The operation of the third embodiment will be explained with reference to FIGS. 13(a) to 13(d) in which the voltage and currents at principal portions are plotted against a relatively short time period. FIG. 13(a) represents the voltage $V_{CE}$ across the transistor 85; FIG. 13(b) for the collector current $I_C$ of transistor 85; FIG. 13(c) for the current $I_L$ in primary winding 94a of transformer 94; and FIG. 13(d) for the current $I_{D2}$ in diode 95. Also in the above figures, $t_1$ and $t_2$ represent the time period during which the transistor 85 is on, and $t_3$ for vice versa. It is noted at this point that the collector current $I_C$ is a combination of the current $I'_C$ in an oscillatory circuit composed of a primary winding 87a of the output transformer 87 and the capacitor 88, plus the current $I_L$ in the primary winding 94a of the transformer 94. It is also noted that the current $I_{D1}$ in the diode 85a is opposite in polarity to the collector current $I_C$. In operation, the control circuit 86 vibrates upon receiving the rectifier 3 output via the resistor 93 to turn the transistor 85 on and off, causing an oscillating current $I'_C$ to flow from the smoothing capacitor 41 and through the primary winding 87a of the output transformer 87 so as to provide a high frequency output voltage across the secondary winding 87b as well as high frequency output voltages across the respective filament windings 87c, whereby the discharge lamp load 6 of the type requiring preheating is lit. During the above operation, the charging of the capacitor by said charge storage means is performed in the following manner. In the time period $t_1$ of turning on the transistor 85, the transistor 85 sees the current $I_L$ from the rectifier 3 through the primary winding 94a together with the current $I'_C$ from said oscillatory circuit to store electromagnetic energy in the primary winding 94a which serves as an inductor. In the subsequent time period $t_2$ of turning off the transistor 85, said electromagnetic energy once stored in the primary winding 94a is released via the secondary winding 94b coupled electromagnetically thereto toward the smoothing capacitor 41 in the form of current $I_{D2}$ which flows from the secondary winding 94b into the capacitor 41 after being rectified by the diode 95 so as to charge the capacitor 41. As is apparent from the above, the present embodiment can also retain the advantageous feature as in the first and second embodiments such that the charge storage means can share with the inverter the switching element and the control circuit thereof and accordingly can be incorporated in the power source circuit without requiring additional components and costs. A modification of the present embodiment can be effective when the primary winding 94a is set to be opposite in polarity to that shown in FIG. 11. In this modification, the secondary winding 94b will take over to produce in response to the transistor 85 being on an output voltage which will charge the smoothing capacitor 41.

Figure 14:
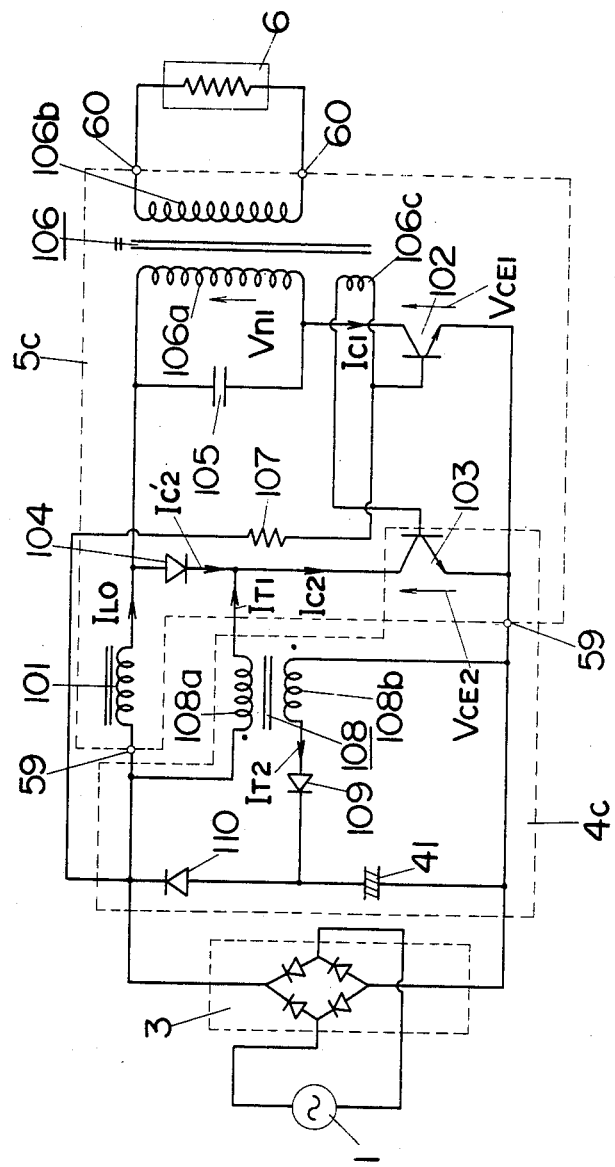
FIG. 14 is a schematic circuit diagram of the power source in accordance with a fourth embodiment of the present invention.

The fourth embodiment is illustrated in FIGS. 14 through 16.

Referring now to FIG. 14, an inverter 5c of this embodiment is of the push-pull type which comprises a choking coil 101, a pair of switching transistors 102 and 103, a diode 104, a capacitor 105, an output transformer 106 and a start-up resistor 107. Said output transformer 106 is provided with a primary winding 106a, a secondary winding 106b and a feedback winding 106c, with the primary winding 106a cooperating with the capacitor 105 to form an oscillatory circuit, the secondary winding 106b being connected to a discharge lamp load 6, and the feedback wiring 106c cooperating with the resistor 107 to form a control circuit for establishing a bias voltage between the base and emitter of the transistors 102 and 103 to be turned on and off alternately. A smoothing circuit 4c coupled to the inverter 5c comprises a smoothing capacitor 41, a transformer 108, diodes 109 and 110, and switching transistor 103 which is common to the inverter 5c, so as to include therein charge storage means with the primary winding 108a of said transformer 108 as inductor means and with said transistor 103. The charge storage means in the above circuit has the same function as in the above embodiment of charging the smoothing capacitor 41 in response to the switching operation of the transistor 103. That is, the output voltage from the rectifier 3 is applied via the primary winding 108a across the transistor 103 so as to store electromagnetic energy each time the transistor 103 is turned on and to release the resulting energy into the smoothing capacitor 41 at each subsequent time of the transistor being turned off. This release of energy from the primary winding 108a is done through the secondary winding 108b which is electromagnetically coupled to the primary winding 108a and through the diode 109 by which the energy fed to the capacitor 41 in the form of current is rectified. The smoothing capacitor 41 is connected in series with diode 110 serving as an isolation diode across the input terminals 59 of the inverter 5c in parallel relationship with the rectifier 3, thus providing a supplementary input dc voltage to the inverter 5c, such input voltage being developed across the smoothing capacitor by the operation of said charge storage means. Accordingly, in the present invention, the smoothing circuit 4c serves as an auxiliary power supply for the inverter 5c which receives the input dc voltage mainly from the rectifier 3.

The operation of the fourth embodiment will be explained with reference to FIGS. 15(a) to 15(b) in which the voltages and currents at principal portions are plotted against the time, and with reference to FIG. 16 illustrating the wave form of the output voltage appearing at the output of the inverter 5c. More detailed references to FIGS. 15(a) to 15(h) are made for easy understanding of the following description. FIG. 15(a) illustrates the wave form of the voltage $V_{n1}$ across primary winding 106a of output transformer 106; FIG. 15(b) for the current $I_{L0}$ in choking coil 101; FIG. 15(c) for the voltage $V_{CE1}$ across transistor 102; FIG. 15(d) for the collector current $I_{C1}$ of transistor 102; FIG. 15(e) for the collector current $I_{C2}$ of transistor 103; FIG. 15(f) for the voltage $V_{CE2}$ across transistor 103; FIG. 15(g) for the current $I_{T1}$ in primary winding 108a of transformer 108; and FIG. 15(h) for the current $I_{T2}$ in the secondary winding 108b. First, the operation of the inverter 5c is now described. When both the transistors 102 and 103 receive the collector currents through the start-up resistor 107 from the full-wave rectifier 3, either of the transistors 102 and 103 is turned on to cause a stabilized current to flow through the choking coil 101 in the circuit. At this instant, the transistor 102 sees a collector current $I_{C1}$ from an oscillatory circuit composed of the primary winding 106a of the output transformer 106 and the capacitor 105 so as to cause the oscillatory circuit to begin resonance at a predetermined frequency. This induces a voltage across the feedback winding 106c of the transformer 106 to alternately turn on and off the transistors 102 and 103. More precisely, when the base current of one transistor 102 increases due to the voltage induced in one direction across the feedback winding 106c, the other transistor 103 will be reverse biased to have no base current, so that the current through the resistor 107 is directed to the transistor 102 as its base current to turn on that transistor 102 while turning off the opposite transistor 103. On the other hand, the subsequent reversing of the voltage induced across the feedback winding 106c causes the transistor 103 to be forward biased and the transistor 102 to be reverse biased, turning on the transistor 103 and simultaneously turning off the transistor 102. Such voltage reversing across the feedback winding 106c results from said resonance in the oscillatory circuit, and the resonance is initiated by the current flowing through the choking coil 101 and the output transformer 106 into the switching transistor 102 being on. It should be noted at this time that electromagnetic energy is stored in the choking coil 101 when the transistor 103 is on to allow current to flow therein and it is released into said oscillatory circuit and the transistor 102 in the form of an additional current to that from the rectifier 3 when the transistor 102 is on, whereby the oscillatory circuit can be properly operated to induce a high frequency output voltage $V_{RF}$ across the secondary winding 106b of the output transformer 106, the output end of which defines the output terminals 60 of the inverter 5c to be connected to the discharge lamp load 6. In the above inverter 5c thus constructed, the transistors 102 and 103 can operate at relatively lower collector voltages $V_{CE1}$ and $V_{CE2}$ so as to reduce the power loss at the respective switching operations, and the collector currents $I_{C1}$ and $I_{C2}$ are to be fed from the input through the choking coil 101 so as to reduce or eliminate an undesirable rush current.

Next, the operation of the smoothing circuit 4c will follow. When the transistor 103 is on during the operation of the inverter 5c, the primary winding 108a of the transformer 108 stores electromagnetic energy from the current therein, and releases the energy through the secondary winding 108b electromagnetically coupled to the primary winding 108a into the smoothing capacitor 41 so as to charge the same. The diode 104 serves to prevent such energy from being released to the part other than the secondary winding 108b, and the energy is released into the capacitor 41 in the form of current which is to be rectified by the diode 109. The resulting dc voltage across the capacitor 41 is applied via the isolation diode 110 to the input terminals 59 of the inverter 5c as an auxiliary voltage supply, such that it provides a supplementary voltage to the inverter 5c when the pulsating dc voltage from the rectifier falls below a predetermined level or the voltage developed across the smoothing capacitor 41. With the arrangement that the inverter 5c of the present embodiment can receive the input from the rectifier 3 and the smoothing capacitor 41, the high frequency output ac voltage $V_{RF}$ appearing on the inverter output has a substantially uniform amplitude or much less fluctuation in amplitude as compared with that which would appear if the inverter were to receive only the pulsating dc voltage from the rectifier 3. A minimum voltage $V_{DC}$ to be supplied to the inverter 5c from the smoothing circuit 4c, or the voltage to be developed across the capacitor 41 can be, of course, altered for specific purposes by suitably selecting the values of the components constituting the smoothing circuit. Also in the present embodiment, the isolation diode 110 is connected in series with the smoothing capacitor 41 across the input terminals 59 of the inverter 5c, so that the capacitor 41 does not act as a reactive load, thus maintaining a high power factor. Aside from the above features, the present embodiment has the same advantageous feature, as in the other embodiments, that the charge storage means in the smoothing circuit 4c shares the transistor 103 as the switching element and the control circuit therefor with the inverter 5c so that it can be simple in circuit arrangement and can be incorporated in the device without requiring additonal components and cost, while retaining the advantage resulting from its arrangement being of the chopper-type that it enables the primary winding 108a or the transformer itself 108 to be reduced to a smaller size.

Figure 17:
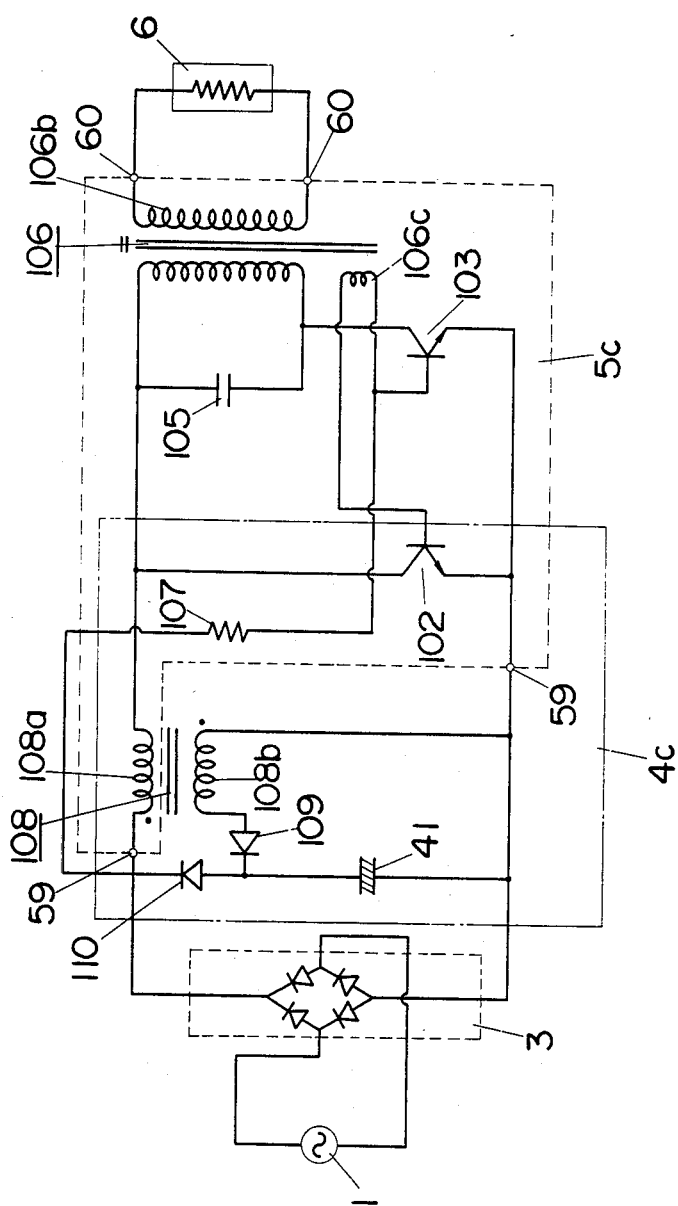
FIG. 17 is a schematic circuit diagram of a modification of the fourth embodiment of FIG. 14.

Referring to FIG. 17, there is illustrated a modification of the above fourth embodiment which is similar to the fourth embodiment except that the primary winding 108a serves also as the choking coil 101 of FIG. 14 and that the diode 104 of FIG. 14 is eliminated. The operation of this modification is identical to that of the fourth embodiment and therefore the description thereof is omitted.

It is to be understood that the above-described embodiments are merely illustrative of the principles of the invention and that other arrangements may be devised by those skilled in the art without departing from the spirit and scope of the invention.

What is claimed is:

1. A power source comprising:
    a full-wave rectifier to provide a pulsating dc voltage output from an input ac voltage;
    a smoothing circuit for receiving the rectifier output to provide a dc voltage output with a reduced ripple;
    an inverter including switching means for switching the dc voltage output from said smoothing circuit to provide a high frequency voltage to be applied to a load to be driven thereby;
    said smoothing circuit comprising a smoothing capacitor, and charge storage means, comprising an inductor means and the switching means, said switching means being included in said inverter and said charge storage means, whereby when the switching means is switched on the inductor means is supplied from current flowing therein with electromagnetic energy which is in turn stored in the capacitor when said switching means is switched off, a resulting voltage developed across the capacitor being applied to input terminals of the inverter.

2. A power source as recited in claim 1, wherein said switching means comprises a pair of series connected switching transistors each connected in parallel with an oppositely polarized diode, said charge storage means sharing with said inverter one of said switching transistors such that when said one of said switching transistors which is shared is switched on the inductor means of the smoothing circuit is supplied with electromagnetic energy which is in turn stored in the smoothing capacitor when said shared switching transistor is switched off, and wherein a said diode coupled to a said switching transistor which is not shared is connected between the inductor means and the smoothing capacitor to form a unidirectional path through which said electromagnetic energy is fed from the inductor means to the smoothing capacitor.

3. A power source as recited in claim 1, wherein said switching means comprises two pairs of switching transistors each pair including two switching transistors connected in series across input terminals of the inverter, each switching transistor being connected in parallel with an oppositely polarized diode, and wherein said smoothing circuit comprises the smoothing capacitor, said inductor means which comprises a pair of inductors, and a pair of charge storage means each including one said inductor and one said switching transistor in each pair, two said switching transistors being common to the inverter and to the smoothing circuit and being arranged such that currents flowing therethrough are substantially 180 degrees out-of-phase, and each diode coupled to a said switching transistor other than one common to a said charge storage means being connected between the smoothing capacitor and a corresponding inductor to form a pair of unidirectional paths through which said electromagnetic energy is fed from respective said inductors to the smoothing capacitor.

4. A power source comprising:
    a full-wave rectifier to provide a pulsating dc voltage output from an input ac voltage;
    a smoothing circuit for receiving the rectifier output to provide a dc voltage output with reduced ripples;
    an inverter including switching means for switching an input dc voltage applied to input terminals thereof to provide a high frequency voltage to be applied to a load to be driven thereby;
    said smoothing circuit comprising a smoothing capacitor, an isolation diode, and charge storage means, comprising an inductor means and the switching means, said switching means being included in said inverter and said charge storage means, whereby when the switching means is switched on the inductor means is supplied from current flowing therein with electromagnetic energy which is in turn stored in the capacitor when said switching means is switched off, a resulting voltage developed across the capacitor being applied to input terminals of the inverter, said rectifier and the smoothing capacitor being connected across the input terminals of the inverter, said isolation diode being in series with the smoothing capacitor such that the inverter receives an input voltage from the smoothing capacitor only when a level of the pulsating dc voltage output from the rectifier falls below that of a voltage developed across the smoothing capacitor.

* * * * *